(12) United States Patent
Oksman et al.

(10) Patent No.: US 10,193,670 B2
(45) Date of Patent: Jan. 29, 2019

(54) METHODS AND SYSTEMS FOR COMMUNICATION

(75) Inventors: Vladimir Oksman, Morganville, NJ (US); Axel Clausen, München (DE)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 1889 days.

(21) Appl. No.: 11/732,968

(22) Filed: Apr. 5, 2007

(65) Prior Publication Data

US 2008/0095174 A1   Apr. 24, 2008

Related U.S. Application Data

(60) Provisional application No. 60/852,463, filed on Oct. 18, 2006.

(51) Int. Cl.
| | | |
|---|---|---|
| *H04L 5/00* | (2006.01) | |
| *H04W 28/16* | (2009.01) | |

(52) U.S. Cl.
CPC .......... *H04L 5/0046* (2013.01); *H04L 5/0037* (2013.01); *H04W 28/16* (2013.01)

(58) Field of Classification Search
CPC .... H04L 5/00; H04L 27/2666; H04L 27/2646
See application file for complete search history.

(56) References Cited

U.S. PATENT DOCUMENTS

| 5,805,203 | A | * | 9/1998 | Horton | 725/119 |
| 5,898,697 | A | * | 4/1999 | Hurme et al. | 370/508 |
| 6,501,791 | B1 | * | 12/2002 | Hwang | 375/222 |
| 6,859,443 | B1 | * | 2/2005 | Mushkin | 370/324 |
| 7,079,549 | B2 | * | 7/2006 | Cioffi et al. | 370/468 |
| 8,085,802 | B1 | * | 12/2011 | Monk et al. | 370/419 |
| 2001/0000136 | A1 | * | 4/2001 | Dixon et al. | 370/342 |
| 2002/0044524 | A1 | * | 4/2002 | Laroia | H04L 5/023 370/203 |
| 2002/0097696 | A1 | * | 7/2002 | Kossi et al. | 370/330 |
| 2002/0155839 | A1 | * | 10/2002 | Nisbet | 455/450 |
| 2002/0196731 | A1 | * | 12/2002 | Laroia | H04L 27/2659 370/206 |
| 2006/0290519 | A1 | * | 12/2006 | Boate | G07C 9/00111 340/573.4 |

OTHER PUBLICATIONS

Author Unknown, MoCA Certification Wave Guarantees Interoperability With Recently Ratified Standard, Actiontec Press Release, Mar. 28, 2006, pp. 1-2.*
Author Unknown, MoCA Membership Brocure: MoCA It's in your house, 2009, pp. 1-6.*
"xDSL Modulation Techniques—Methods of achieving spectrum-efficient modulation for high quality transmissions", A Nextep Broadband White Paper, May 2001, 9 pgs.
MOCA MAC/PHY Specification v. 2.0, Author Unknown, Multimedia over Coax Alliance, Jun. 8, 2010, pp. 1-315.

* cited by examiner

*Primary Examiner* — Christopher M Crutchfield
(74) *Attorney, Agent, or Firm* — Eschweiler & Potashnik, LLC

(57) ABSTRACT

One embodiment relates to a communication system. The communication system includes a central node that is coupled to a communication channel and configured to individually communicate with a number of network nodes over a frequency range. One of the network nodes can identify a common frequency band that is within the frequency range and on which the central node and network nodes can transmit a signal. Other methods and systems are also disclosed.

18 Claims, 6 Drawing Sheets

METHODS AND SYSTEMS FOR COMMUNICATION

RELATED APPLICATION

This application claims priority to U.S. Provisional Application Ser. No. 60/852,463 filed Oct. 18, 2006, entitled "METHODS AND SYSTEMS FOR COMMUNICATION."

FIELD OF THE INVENTION

The present invention relates generally to communication methods and systems, and more specifically to communication service in a communication system.

BACKGROUND OF THE INVENTION

In today's business climate, industry fortunes rise and fall on whether information is exchanged in an efficient manner. For example, cell phones, pagers, and the Internet have thrived because each technology allows businesses to exchange critical market information at a moment's notice. In addition, such technologies allow individuals to keep abreast of recent developments with family and friends. In short, many segments of our modern society require instant access to accurate, up-to-the-minute information.

Companies spend significant resources to develop modern communication systems that provide people with such information. As local access communication systems have matured, data rates have increased from 20 kilobits per second (kb/s) in 1975 with dialup modems to 100 Mb/s with modern VDSL and other network technologies. In other words, customers in today's "information age" can receive data approximately 5,000 times as fast as network customers of thirty years ago. To bring customers into this modern "information age", developers have spent billions of dollars to develop network technology as we now know it. To continue to increase data rates at such a remarkable pace, communication systems developers will likely be required to spend significant capital resources for many years to come.

When such high speed data carrying a variety of services arrives at a customer premises (e.g., an individual's home or office), a network gateway distributes that high-speed data to various user devices (e.g., TV sets, computers, video conferencing devices, etc.). Those devices are usually connected as network nodes into a local area network, also called home-networks. By using a home-network, a communication system can distribute high-speed or broadband data carrying various services to multiple network nodes and further to used end devices.

In existing communication systems such as home networks, multiple network nodes cause signal reflections that can significantly increase signal attenuation. Reflections in these communication systems result in the additions of echo to the transmitted data signals. Echoed signals can ultimately cause the data signals to spread over time (i.e., increase or decrease, depending on the relative phase of the echo). Due to reflections, signal attenuation might be very significant and may differ from one network node to another. Further, any change in network configuration (e.g., addition or removal of a network node), may change the attenuation between all other nodes because it changes the signal reflected from this node. Thus, communication systems are very dynamic, and the transmission technology used to transmit high-speed data should be capable of adjusting its parameters quickly to adapt to changes in the system.

Existing communication systems that use continuous transmission mode (e.g., DSL, ADSL, VDSL) are advantageous because they have relatively high data rates due to extensive training prior to the data transmission. However, these existing systems suffer from a major drawback in because they must undergo extensive re-training to adapt to considerable changes in channel characteristics. This re-training takes a rather long time (e.g., approximately 30 seconds in modern DSL), and as such makes continuous data transmission mode impractical in existing communication systems.

While the existing methods and systems for communication systems are sufficient for their stated purpose, they are not sufficient to accurately account for quick multiple changes in a characteristic of the communication channel during communication service. Thus, improved methods and systems are needed.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

In one embodiment, a communication system includes a central node that is coupled to a communication channel and configured to individually communicate with a number of network nodes over a frequency range. One of the network nodes is configured to identify a common frequency band that is within the frequency range and on which the central node and network nodes can transmit a signal.

The following description and annexed drawings set forth in detail certain illustrative aspects and implementations of the invention. These are indicative of but a few of the various ways in which the principles of the invention may be employed.

DETAILED DESCRIPTION OF THE INVENTION

Figure 1:
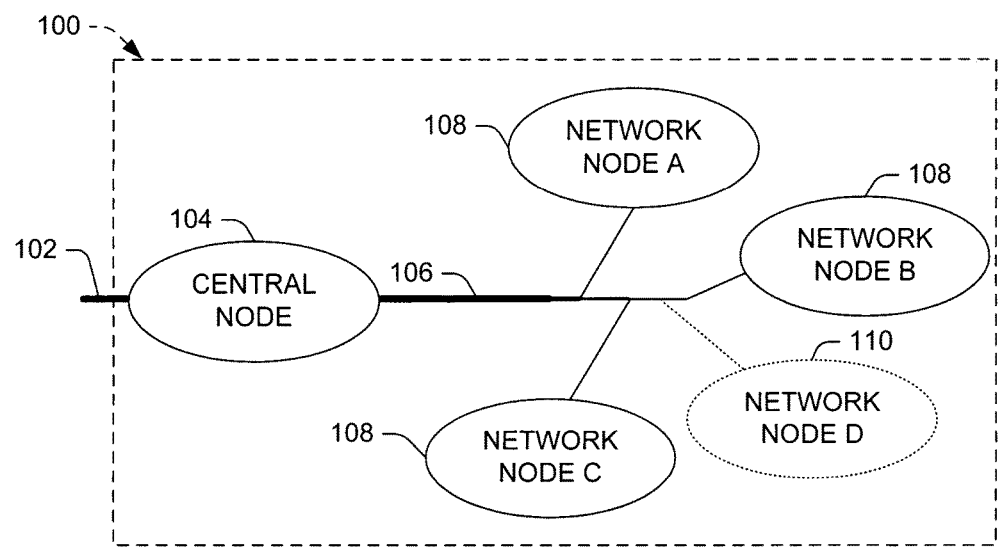
FIG. 1 illustrates one embodiment of a communication system.

The present invention will now be described with reference to the drawings wherein like reference numerals are used to refer to like elements throughout, and wherein the illustrated structures are not necessarily drawn to scale. In addition, although various embodiments may be described and illustrated with reference to a hardware structure, the functionality and corresponding features of the system can also be performed by appropriate software routines or a combination of hardware and software. Thus, the present invention should not be limited to any particular implementation and shall be construed to cover any implementation that falls within the spirit and scope of the claims.

FIG. 1 shows one embodiment of a communication system or communication network 100. In one embodiment, the communication system 100 relates to a local area network, such as a home network that transfers data via a continuous transmission mode. In one embodiment, the communication system 100 is configured to be coupled to a transmission line 102 to facilitate the transfer of high-speed data between the communication system 100 and an external device or system (not shown).

Within the communication system 100, a central node 104 is configured to be coupled between the transmission line 102 and a communication channel 106, and facilitates the transfer of the high-speed data with multiple network nodes 108, 110 (e.g., network node A, network node B, network node C, and network node D). In one embodiment, the network nodes may be characterized as initial network nodes 108 (e.g., network node A, network node B, network node C) and subsequent network nodes 110 (e.g., network node D), wherein a subsequent network node 110 may be added to or removed from the system 100 at some subsequent time relative to when the initial network nodes 108 became associated with the system 100. Each of network nodes A, B, . . . D can be a gateway to another network (sometimes called sub-network). These sub-networks, if present, could be considered client devices of the network nodes.

Based on the service requirements or priorities of the network nodes, the central node 104 could allocate bandwidth to each initial network node 108 as a function of an initial frequency band plan. While the initial frequency band plan is employed, the nodes may transfer data and simultaneously monitor the relevant branches of the communication channel 106. If a subsequent network node 110 requests access to the system (e.g., requests access on a common frequency band), the initial nodes can be switched from the initial frequency band plan to a modified frequency band plan that effectively reallocates the bandwidth associated with the initial network nodes to account for the addition of the subsequent network node to the system and/or other changes in service.

In order to more fully appreciate aspects of the present invention, various manners in which the network nodes 108, 110 may utilize multiple carrier frequencies to communicate with the central node 104 over the communication channel 106 are discussed, wherein the multiple frequencies are selectively associated with the initial band plan and modified band plan. As shown in FIG. 2-FIG. 5A, all or portions of the frequency range 200 available on the communication channel 106 could be divided into numerous individual carrier frequencies 202 on which symbols or other data elements could be transmitted. In various implementations, carrier frequencies 202 may also be referred to as sub-channels, sub-carriers, tones, and the like. To avoid disturbance between nodes communicating over the common communication channel, communications between the central node and network nodes are established using orthogonal signals. If the orthogonal signals use the same frequency set (the common access frequency set, FIG. 2-FIG. 5), the signals use different carrier frequencies or are separated by time, or by a specific modulation parameter.

Similarly, if a direct communication between two network nodes (e.g., nodes A and C in FIG. 1) over the communication channel is desired, a set of carrier frequencies could be assigned for this communication. Those frequencies are not supposed to be used by other nodes, including the central node.

In one embodiment, for example, if a limited number of initial network nodes 108 are associated with the system, a relatively large number of frequencies could be assigned to each initial network node to assure low bit loading per frequency and reliable operation. As subsequent network nodes 110 become associated with the system, the number of frequencies associated with each network node may be reduced, while bit loading per frequency may be increased to keep the required bit rate. After some network nodes sign out, the number of frequencies associated with each network node may again be increased. Therefore, the bandwidth associated with the various nodes can be dynamically adjusted to account for a change in channel characteristics (e.g., a subsequent network node accessing the system).

Figure 2:
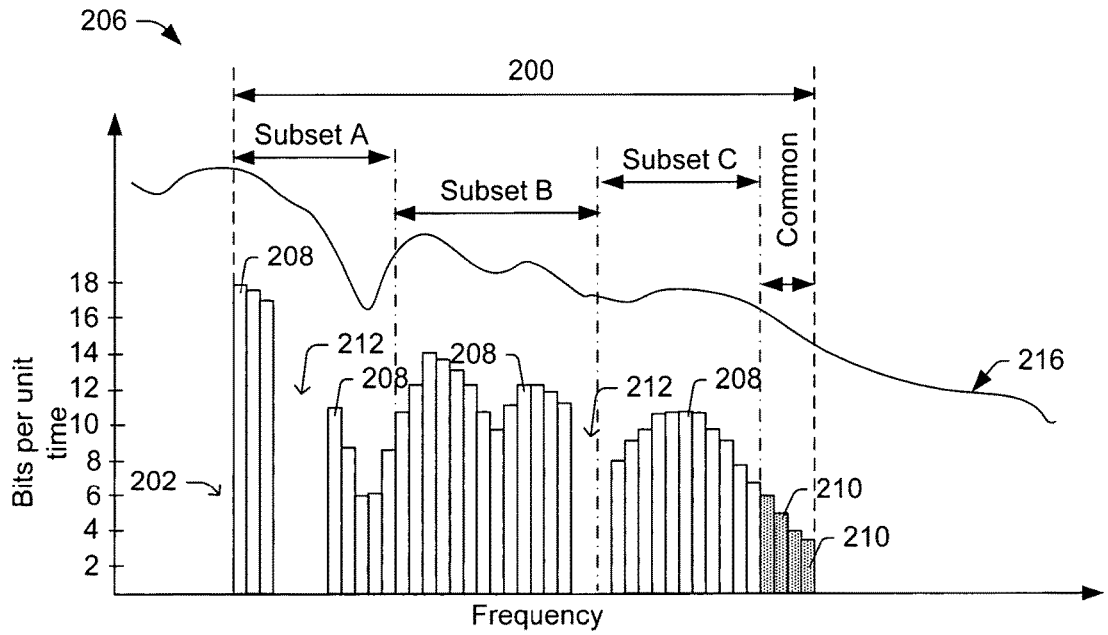
FIGS. 2-5A each relate to one embodiment of a frequency allocation that could be made in a communication system.

As shown in FIG. 2, one illustrative initial frequency band plan 206 includes initial subsets of frequencies (e.g., Subset A, Subset B, and Subset C) and one or more common frequency bands (e.g., Common). In one embodiment, each initial subset of frequencies is used to communicate data between the central node and only one respective network node, or between two pre-assigned nodes, while all nodes can transmit data on the common frequency band. Thus, the initial subsets of frequencies can be flexibly and dynamically allocated between various nodes, while the common frequency band is continually available to the nodes. The initial frequency plan 206 can also comprise unassigned frequencies 212 within the frequency range 200, which could be reserved for new-coming additional nodes.

The initial subsets of frequencies (e.g., Subset A, Subset B, and Subset C) are associated with individual network nodes (e.g., FIG. 1 network node A, network node B, network node C, respectively), wherein the individual network nodes can communicate data with the central node or with another network node on a number of dedicated frequencies 208, on which symbols or other data elements can be transferred. In various embodiments, each initial subset of frequencies can be subdivided into one frequency band for transmitting data (e.g., an upstream band) and another frequency band for receiving data (e.g., a downstream band). It should be noted that the subset of frequencies assigned for a particular node could be further divided into several smaller subsets distributed over the frequency band. In this case the node can use all or part of these subsets.

The common frequency band (Common) in FIG. 2-FIG. 5, which may also be referred to as a service channel, comprises a number of carrier frequencies 210 on which the central node 104 and all of the network nodes 108, 110 can transfer data. The common frequency band may be used, for example, to allow subsequent nodes to access the network, for system recovery after power is turned off, or after major changes in system or network configuration, and so on. For every node, including the central node, the common frequency band may also be divided into a band for transmitting data (e.g., an upstream band to be used when a network node transmits to the central node) and another band for receiving data (e.g., a downstream band to be used when a network node receives from the central node). In another embodiment the common channel can be also used for communication between the nodes (not necessarily with the central node). Other implementations are also possible.

Figure 3:
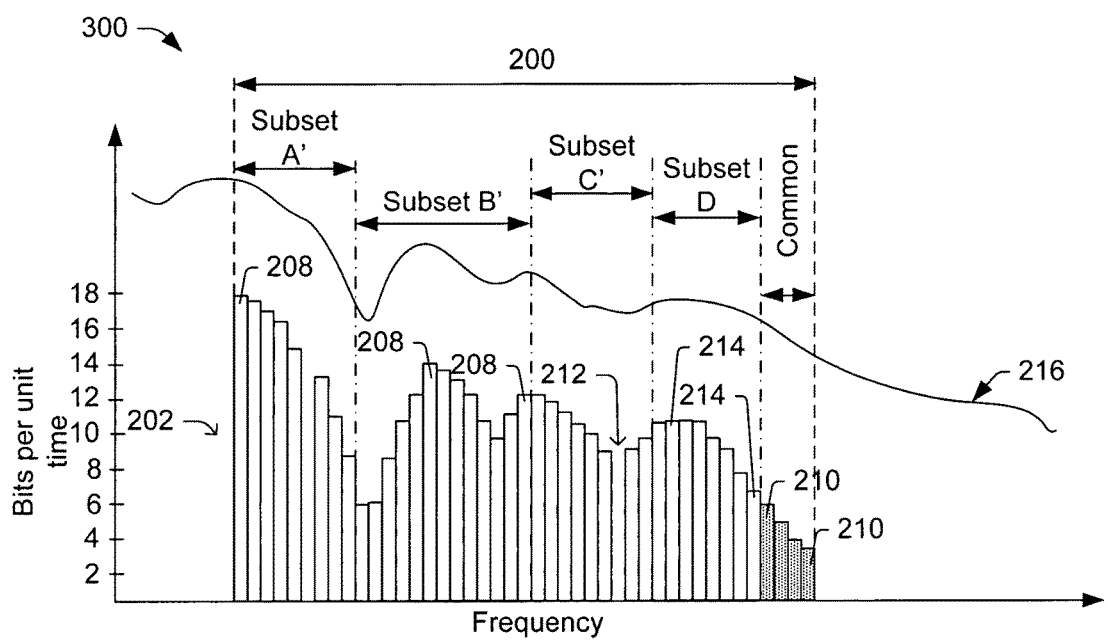

If a change in communication channel characteristics is detected, the network nodes can switch from the initial band plan to a modified band plan. FIG. 3 shows one illustrative modified frequency band plan 300. In the modified frequency band plan 300, the central node (which can act as a master node in the system) has allocated a number of subsequent dedicated frequencies 214 to accommodate a subsequent network node (e.g., network node D), wherein the group of subsequent dedicated frequencies may be referred to as a subsequent frequency subset (e.g., Subset D). In one embodiment, the system can accommodate the subsequent network node 110 by providing the subsequent network node with subsequent dedicated frequencies 214 that were previously associated with the initial frequency subsets or with the unassigned frequencies 212, or combinations thereof. Thus, the modified frequency subsets (e.g., Subset A', Subset B', and Subset C') may differ from the initial frequency subsets (e.g., Subset A, Subset B, and Subset C, respectively) in the number of dedicated frequencies that are associated with each network node (e.g., network node A, network node B, and network node C, respectively).

In one embodiment during the initial band plan and modified band plan, the number of bits transmitted per unit time on each carrier frequency 202 may be based on a signal-to-noise ratio (SNR) 216 that is measured over the frequency range 200 or measured over each carrier frequency 202. Typically, more bits are transmitted on carrier frequencies that have a relatively high SNR, while fewer bits are transmitted on frequencies that have a relatively low SNR. If the noise on one carrier frequency becomes too high, then the communicating nodes can switch one or more bits carried by this frequency to another frequency. In one embodiment, the communicating nodes switch data bits between carrier frequencies that are within the frequency subset assigned to the communicating nodes. In other embodiments, the central node can alter the assignments of the frequency subsets so as to account for noise on one or more channels. Thus, the nodes can continually switch data from one frequency to another to provide high initial data rate while having relatively few data errors. Although monitoring of many carrier frequencies and encoding and decoding data conveyed on each frequency makes this multicarrier communication computationally complex, it gives the nodes the ability to provide users with high speed data connections with relatively few errors for an unstable noise environment, such as home telephone wiring or home power wiring.

Figure 4:
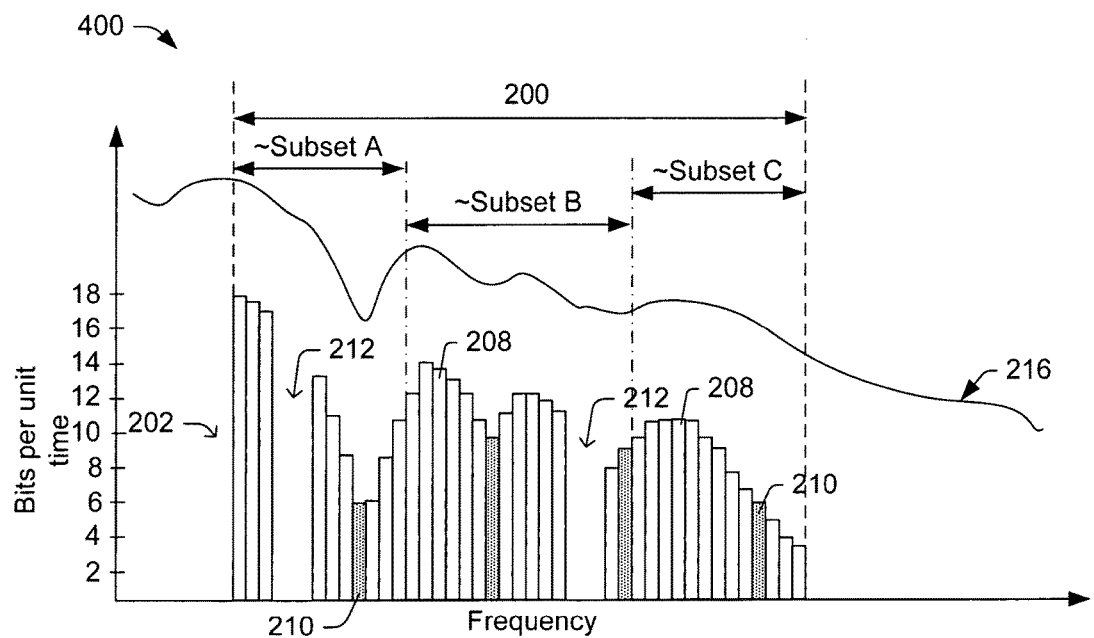
Figure 5:
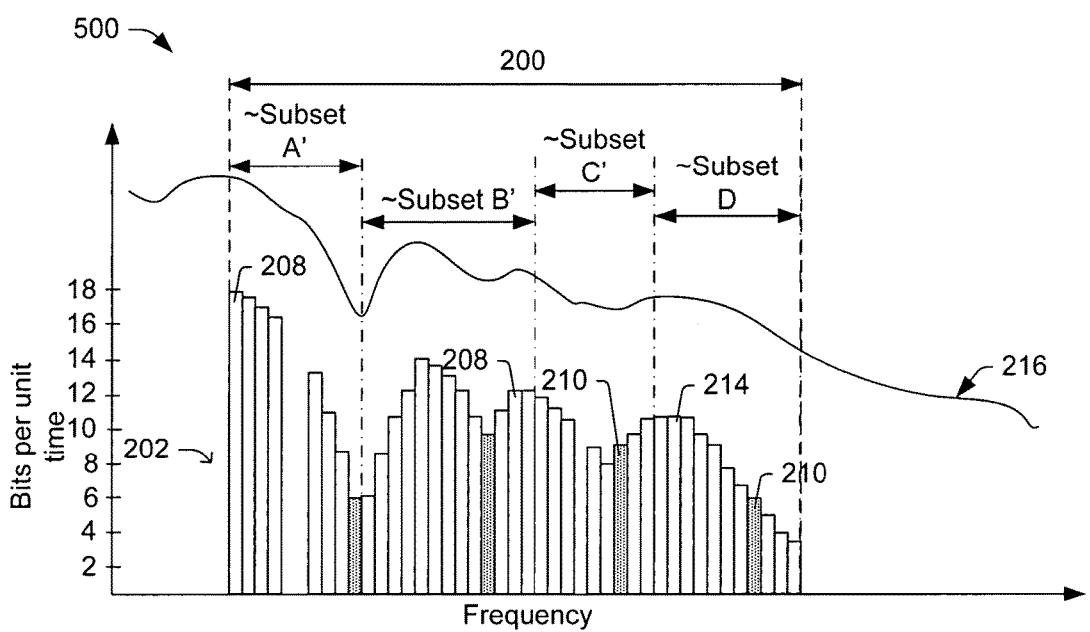
Figure 5A:
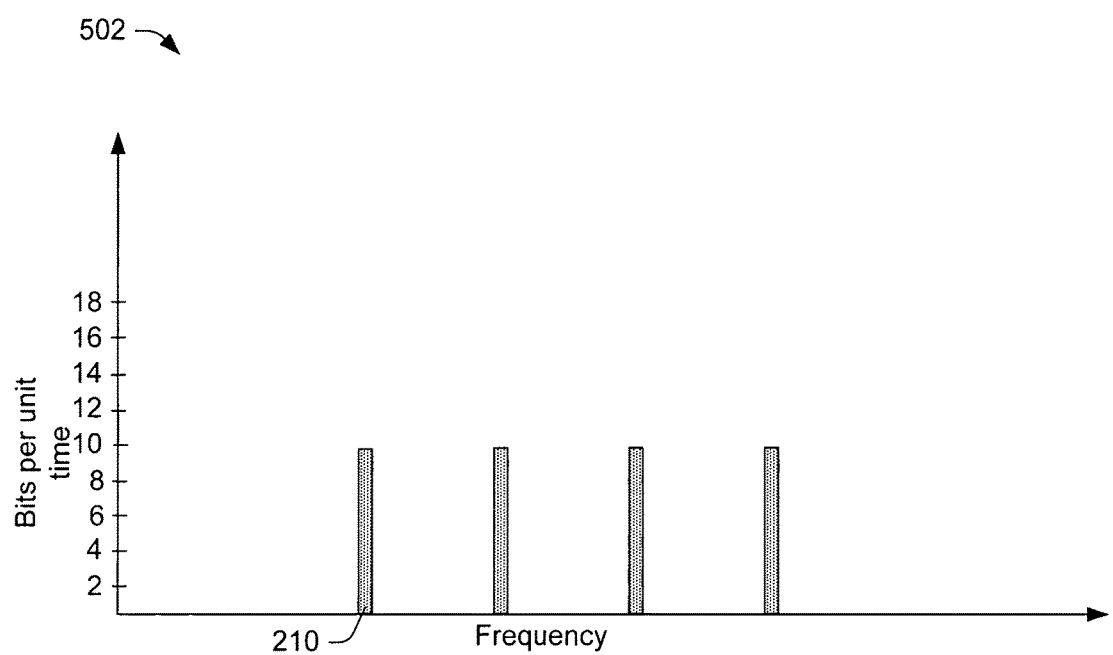

It will be appreciated that there are numerous ways in which the individual frequencies of the initial band plan and modified band plan could be associated with the network nodes 108, 110. For example, FIG. 4 shows another embodiment of an initial frequency band plan 400 in which the common frequencies 210 of the common frequency band are interspersed with the dedicated frequencies 208 of the initial frequency subsets. In other embodiments, the individual initial subsets of carrier frequencies (e.g., Subset A) could include dedicated frequencies that are non-adjacent (i.e., not in a continuous frequency range). Further, FIG. 5 shows one embodiment of a modified frequency band 500, 502 in which the common carrier frequencies 210 are interspersed with the modified frequency subsets. The individual subsequent subsets of frequencies can also comprise non-adjacent frequencies.

Additionally, it will be appreciated that bandwidth can be allocated or reallocated in various ways. In one embodiment, the number of frequencies within a given subset can be adjusted to adjust bandwidth. For example, to increase the bandwidth to Subset A, the central node could dedicate more carrier frequencies to network node A. In another embodiment, the number of bits per unit time (e.g., the bit loading) on a given carrier frequency could be adjusted to adjust bandwidth (and, respectively, the bit rate). For example, the power at which symbols are transmitted on a particular frequency of Subset A could be increased to increase the bandwidth to network node A.

With the described flexible and dynamically adjusted band plan used to transfer data between nodes, in one embodiment there is a dedicated fixed set of carrier frequencies assigned for a service channel, which is known by all nodes and used by the central node to transmit essential network information to all nodes. The service channel can be used for nodes the first time they connect to the system (with no history available) or for system recovery after power switch off, major changes in network configuration, and so on. One example of a service channel distributed over the available frequency range is presented in FIG. 5A. In one embodiment, the service channel is used for downstream transmission from the central node to all other nodes (downstream broadcast) to distribute management information which is used for a node to join the network and other management purposes.

Other implementations are also possible.

Figure 6:
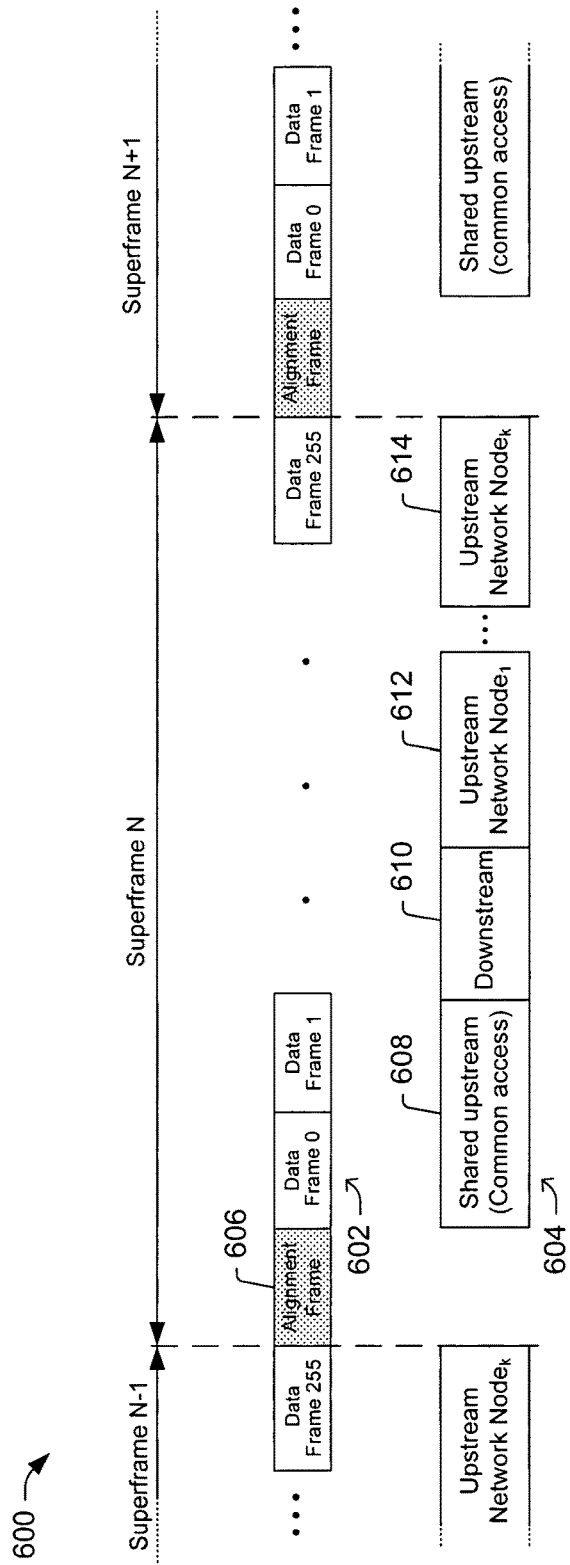
FIG. 6 is a chart relating to one embodiment of a signal stream for a communication system.

Referring now to FIG. 6, one can see one embodiment of a signal stream 600 that could be transferred on one or more of the common frequencies 210 between the central node 104 and network nodes 108, 110. In one embodiment, the signal stream 600 on the common frequency band comprises a number of frames 602 in which data and/or control signals are transferred. The network operates synchronously based on the timing of the frames and the superframes. The communicating nodes may group the frames 602 into time windows 604, which may be uniquely reserved for distinct tasks in a manner that allows efficient bandwidth allocation that has been previously unavailable in the art.

Thus, the time windows 604 can be arranged at predictable locations or times within a superframe that includes D frames, wherein a superframe starts at a time relative to an alignment frame 606, which may be a sync symbol in one embodiment. For example, in the illustrated embodiment, D=257 and the first two data frames in superframe N (i.e., Data Frame 0 and Data Frame 1) correspond to a time window that is utilized for common access (shared upstream). During this common access time window 608, any network node, including central node, may transmit data to the central node or to the other node. The next frames (within ellipses of frames 602) are reserved for downstream transmission (Downstream 610) from the central node to all of the network nodes, during which the network nodes could synchronize themselves relative to the other nodes.

Following this downstream transmission 610, the remainder of time windows in SuperFrame N are devoted to communications from individual network nodes to the central network node or from one node to another, wherein each network node has a unique time window within the Superframe. For example, one window (Upstream Network Node$_1$ 612) would be reserved for transmission from a first network node to the central node, while another window (Upstream Network Node$_k$ 614) would be reserved for a transmission from a $k^{th}$ network node to the central node.

Thus, in one embodiment, the number of time windows within a given superframe relates to the number of network nodes currently associated with the system or to be associated with the system, wherein particular frames of the signal stream are reserved for particular network nodes. Thus, by using a superframe or other similar construction, the network nodes 108, 110 can share the common frequency band without interfering with each others' communications.

In one implementation, an alternating sync symbol provides a time marker for online-reconfiguration of the bandplan or bit loading on specific carrier frequencies, or both.

This alternation may be a phase inversion, specific modulation of some tones, specific power levels or other special patterns used. Other suitable schemes could also be employed.

In addition to or in substitution of one or more of the illustrated components, the illustrated communication system and other systems of the invention include suitable circuitry, state machines, firmware, software, logic, etc. to perform the various methods and functions illustrated and described herein, including but not limited to the methods described below. While the methods illustrated herein are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the operation of communication systems which are illustrated and described herein (e.g., communication system 100 in FIG. 1) as well as in association with other systems not illustrated, wherein all such implementations are contemplated as falling within the scope of the present invention and the appended claims.

Figure 7:
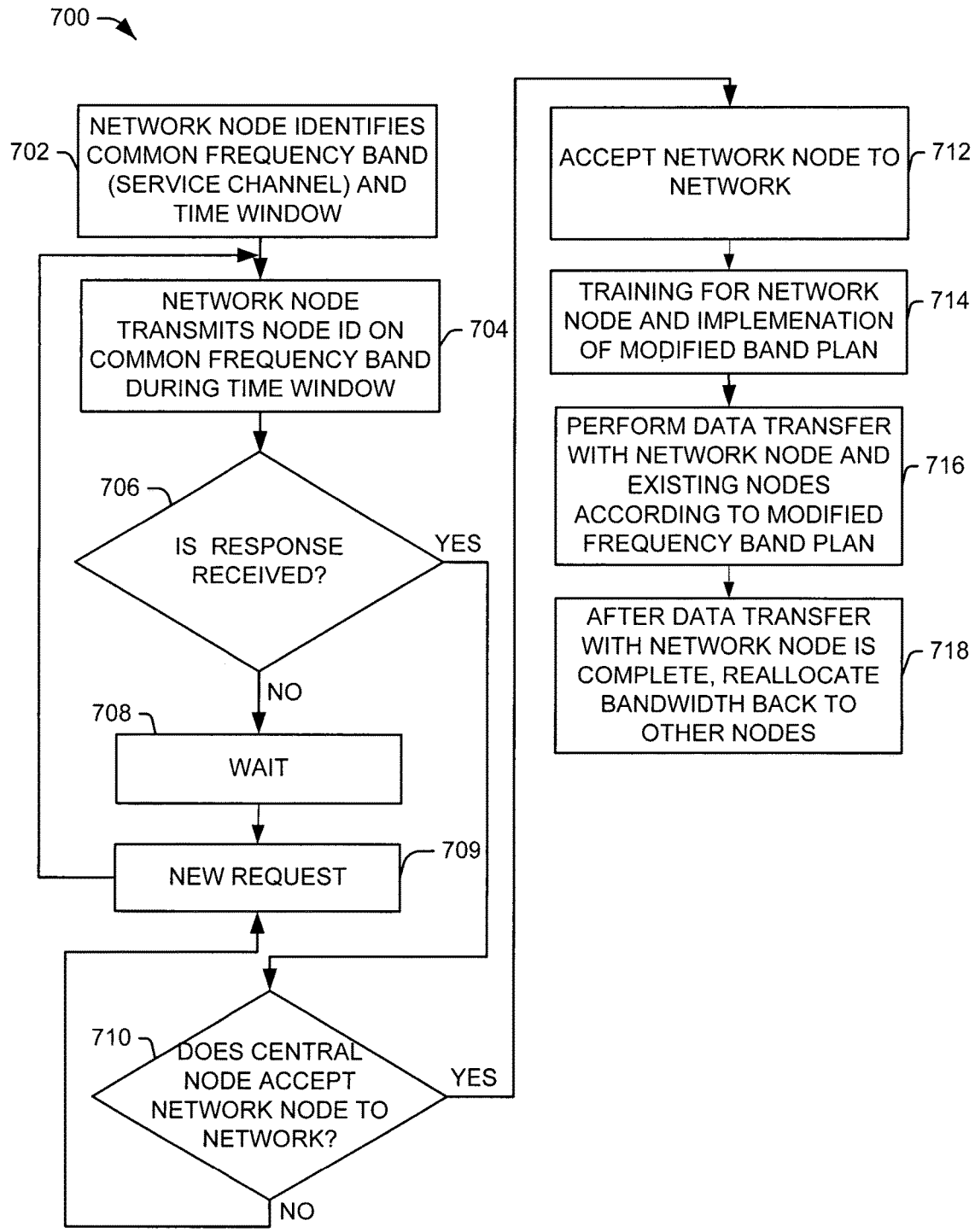
FIG. 7 is a flow chart relating to one embodiment of a communication protocol for a communication system.

FIG. 7 shows one embodiment of one method 700 that relates to aspects of the present invention. In particular, the method 700 is illustrated and described in the context of a subsequent network node 110 accessing the system 100 over a common frequency band. However, it will be appreciated that the method is applicable to other procedures that could be carried out over one or more common frequency bands.

In step 702, the subsequent network node (which is not yet logged into the system) "listens" to the existing communications on the communication channel and identifies transmitted frames and data one or more common frequencies of a common frequency band and a time window therein. In one embodiment the node first identifies the pre-defined carrier frequencies of the service channel, while is others it might search for a carrier frequency which carry the valid management information. In one embodiment, the time window could be a time window that is allocated for a particular subsequent network node, while in other embodiments that time window could be available for data transfer for all network nodes. The identification of the time window could be made with reference to an alignment frame as previously discussed.

In step 704, the subsequent network node requests access to the network on the common frequency band during the time window and waits for a response. This request for access can comprise transmitting a node identifier to the central node. In one embodiment, the node identifier is its MAC address.

If the subsequent network node does not receive a response to its request during the timeout period (NO at 706), the subsequent network node can wait a random time or some other time at 708 and then repeat the request at 709.

On the other hand, if the subsequent network node does receive a response to its request (YES at 706), the method proceeds to 710. If the central node responds by rejecting the subsequent network node (NO at 710), then the subsequent network node can request access again in 709.

If the central node responds to the subsequent network node access request by accepting the node to the network (YES at 710), then the subsequent network node and central node can negotiate the parameters/conditions of acceptance of the subsequent network node to the system in step 712. During this step, the subsequent network node can provide information about its service requirements (e.g., quality of service, bandwidth requirements, etc.) and available loop information (e.g., SNR measurements, loop attenuation on some frequencies, etc.). Based on this information, the central node can reallocate the bandwidth for one or more of currently operating (initial) network nodes, if necessary, to accommodate the subsequent network node. The bandwidth of the initial nodes is reallocated (i.e. transitions to a modified frequency plan) seamlessly, i.e. with no errors or disruption to the existing connections in the network. In one embodiment, the central node can derive the upstream and downstream bandwidth for the subsequent network node and communicate this bandwidth to the subsequent network node. In one embodiment, all communication between the central node and the subsequent network node up to this point uses pre-defined bit loading (e.g., quad phase shift keying (QPSK)).

In step 714 the central node and the subsequent network node start transmitting training signals in the upstream and downstream directions. During the training, SNR measurements for each tone in the assigned frequency subsets are exchanged and the central node determines the bit loading and final gains for these tones in both transmission directions. Further, starting after a predefined time, both the central and the subsequent network node implement the determined bit loading and gains and proceed to data transfer.

Similarly, training signals could be established between any two regular nodes, providing accurate settings for bit loading, under supervision of the central node. In this case, to avoid interruption with other parts of the network, the two communication nodes has to be set on a dedicated frequency band.

In step 716, the central node; the subsequent network node and initially operated network nodes transfer data according to the modified frequency band plan, wherein one or more individual frequencies can be allocated exclusively to the subsequent network node.

In 718, after data transfer with the subsequent network node is complete, the central node can change from the modified frequency band plan to another frequency band plan (e.g., the initial frequency band plan or some other suitable frequency band plan). During this another frequency band plan, bandwidth can be reallocated back to the initial network nodes, for example, or otherwise reallocated if desired. The bandwidth reallocation is performed seamlessly, with no errors and interruptions of services in any of the operating nodes.

Although the invention has been illustrated and described with respect to one or more implementations, alterations and/or modifications may be made to the illustrated examples without departing from the spirit and scope of the appended claims.

For example, a transmission line 102 can comprise wireline transmission line(s) including, but not limited to: wire transmission lines (e.g., twisted pair of copper wires), cable transmission lines (e.g., coax cable), and optical transmission lines. Other illustrative transmission lines could include wireless transmission lines, or combinations of wireline and wireless transmission lines. Further, illustrative transmission lines could support single-frequency communication or multi-frequency communication.

Similarly, the communication channel 106 can comprise wireline communication channel(s) including, but not limited to: wire communication channels (e.g., twisted pair of copper wires), cable communication channels (e.g., coax cable), and optical communication channels. Other illustrative communication channels could include wireless communication channels, or combinations of wireline and wireless communication channels. In one embodiment, the communication channel is an existing phone network in a residential home or office and by which the network nodes communicate over the communication channel via DSL or some other multi-carrier modulation technology.

In addition, in one embodiment the high-speed data transferred over the communication system could relate to, but is not limited to, one or more of: INTERNET data, telephony data, video data, video teleconferencing data, intra-network data, and the like. In other embodiments other types of data including low-speed data could also be transferred over the communication system.

In addition, the central nodes and network nodes could manifest themselves in various forms, depending on the implementation. For example, in one embodiment, the central node could be located at a customer's residence in the form of a residential gateway (RG) or a DSL modem (CPE). In one embodiment, network nodes 108, 110 could comprise various home appliances (e.g., computer, television or another video system, videoconferencing device, refrigerator, camera, music player, fax, etc.).

In particular regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising". In addition, to the extent that the terms "number", "plurality", "series", or variants thereof are used in the detailed description or claims, such terms are to include any number including, but not limited to: positive integers, negative integers, zero, and other values.

What is claimed is:

1. A communication network, comprising:
    a central node configured to allocate bandwidth at which data is transferred to and from initial network nodes over a communication channel according to an initial frequency band plan, the initial frequency band plan comprising:
        a number of dedicated frequencies associated with the respective initial network nodes; and
        a common frequency band on which the central node and initial network nodes communicate, wherein communication over the common frequency band includes a number of time windows that are respectively and uniquely associated with the number of initial network nodes; and
    wherein the central node is further configured to reallocate the bandwidth according to a modified frequency band plan to account for a subsequent network node requesting access to the communication network,
    wherein frequencies of the common frequency band are interspersed with the dedicated frequencies, or
    wherein the frequencies of the common frequency band are all above the dedicated frequencies.

2. The network of claim 1, wherein the subsequent network node is configured to request access to the communication system during one of the time windows that is reserved for subsequent network node requests.

3. The network of claim 1, wherein the initial and modified frequency band plans comprise a number of dedicated frequencies associated with each network node, and wherein the number of dedicated frequencies associated with at least two network nodes differs between the initial frequency band plan and the modified frequency band plan.

4. The network of claim 1, wherein the initial frequency band plan comprises:
    an initial first subset of frequencies over which data is transferred at an initial bandwidth between a first network node and the central node.

5. The network of claim 4, wherein the modified frequency band plan comprises:
    a modified first subset of frequencies over which data is transferred between the first network node and the central node, wherein the modified first subset of frequencies provides a modified bandwidth that is less than the initial bandwidth; and
    a second subset of frequencies that is allocated to the subsequent network node and over which data is transferred between the subsequent network node and the central node or between the subsequent network node and at least one of the initial network nodes.

6. The communication network of claim 1, wherein the common frequency band further comprises:
    a first time window during which only a first of the initial network nodes transmits data to the central node; and
    a second time window during which the first of the initial network nodes receives data from the central node.

7. The communication network of claim 6, wherein the common frequency band further comprises:
    a third time window reserved for subsequent nodes to request access to the communication network.

8. The communication network of claim 1, wherein the common frequency band further comprises:
    a first time window during which only a first of the initial network nodes transmits data to a second of the initial network nodes other than the central node; and
    a second time window during which only the second of the initial network nodes transmits data to the first of the initial network nodes.

9. The network of claim 1,
    wherein apart from frequencies of the common frequency band the dedicated frequencies form a single continuous dedicated frequency band for each network node.

10. A method of communicating, comprising:
    dividing a frequency range into a number of frequencies;
    associating some of the number of frequencies with initial frequency subsets on which respective network nodes transfer data;
    associating at least another of the number of frequencies with a common frequency band on which the network nodes and a subsequent network node can transfer data, wherein communication over the common frequency band is characterized by a number of time windows that are respectively and uniquely associated with the network nodes, wherein frequencies of the common frequency band are interspersed with the frequency subsets, or wherein the frequencies of the common frequency band are all above the frequency sub sets.

11. The method of claim 10, wherein the subsequent network node requests access to the network on the common frequency band during one of the time windows that is reserved for subsequent network node requests.

12. The method of claim 11, wherein the request for access comprises transmitting a node identifier associated with the subsequent network node.

13. The method of claim 10, further comprising:
altering a bandwidth at which data is provided to the network nodes to accommodate the subsequent network node.

14. The method of claim 10, further comprising:
re-allocating the some of the number of frequencies to accommodate the subsequent network node such that one frequency subset comprises more of the some of the number of frequencies and another frequency subset comprises fewer of the some the number of frequencies.

15. A method for communicating in a communication system, comprising:
transferring data on a communication channel between a central node and a number of initial network nodes or between individual initial nodes according to an initial frequency band plan wherein initial frequency subsets are respectively associated with individual initial network nodes;
adding a subsequent network node to the communication system by using a common frequency band and transferring data between the central node and the initial and subsequent network nodes according to a modified frequency band plan that differs from the initial frequency plan, wherein communication over the common frequency band is characterized by a number of time windows that are respectively and uniquely associated with the network nodes,
wherein frequencies of the common frequency band are interspersed with the frequency subsets, or
wherein the frequencies of the common frequency band are all above the frequency sub sets.

16. The method of claim 15, wherein the subsequent network nodes requests access to the communication system during one of the time windows.

17. A communication system, comprising:
communication means for individually communicating with a number of network nodes over a frequency range, each network node being associated with dedicated frequencies;
wherein the communication means transmits a signal stream on a common frequency band that is within the frequency range, wherein the signal stream relates to a number of time windows that are respectively related to the number of network nodes,
wherein frequencies of the common frequency band are interspersed with the dedicated frequencies, or
wherein the frequencies of the common frequency band are all above the dedicated frequencies.

18. The system of claim 17, wherein the communication means is configured to uniquely communicate with each of the number of network nodes via a unique subset of the frequency range associated with that network node.

* * * * *